United States Patent [19]

Matsumoto et al.

[11] 4,198,327

[45] Apr. 15, 1980

[54] GRAFTED POLYOLEFIN COMPOSITION HAVING IMPROVED ADHESIVENESS

[75] Inventors: Hisashi Matsumoto, Iwakuni; Hiroji Niimi, Waki, both of Japan

[73] Assignee: Mitsui Petrochemical Industries Ltd., Tokyo, Japan

[21] Appl. No.: 753,412

[22] Filed: Dec. 22, 1976

[30] Foreign Application Priority Data

Dec. 27, 1975 [JP] Japan .................................. 50-155864

[51] Int. Cl.$^2$ .......................... C08C 4/00; C08L 7/00; C08L 23/26
[52] U.S. Cl. ........................................ 260/4; 428/492; 428/500; 428/521; 428/522; 428/523; 525/73; 525/74; 525/77; 525/78; 525/80; 525/81; 525/84; 525/86
[58] Field of Search .................... 260/3, 876 R, 876 B, 260/897 B, 4 R, 4 A, 5; 525/73, 74, 77, 78, 80, 81, 84, 86

[56] References Cited

U.S. PATENT DOCUMENTS

| | | | |
|---|---|---|---|
| 3,868,433 | 2/1975 | Bartz et al. | 260/876 |
| 3,966,845 | 6/1976 | Van Brederode et al. | 260/876 |
| 4,087,587 | 5/1978 | Shida et al. | 260/876 R |
| 4,087,588 | 5/1978 | Shida et al. | 260/876 R |

*Primary Examiner*—Harold D. Anderson
*Attorney, Agent, or Firm*—Sherman & Shalloway

[57] ABSTRACT

A composition having improved adhesion to polar solid materials which comprises
(A) 99 to 70 parts by weight of a modified crystalline polyolefin having grafted thereto a monomer selected from the group consisting of unsaturated carboxylic acids and their anhydrides, esters, amides imides and metal salts, said crystalline polyolefin having a degree of crystallinity measured by an X-ray analysis, of at least 25% and containing the grafting monomer in an amount of 0.0001 to 3% by weight based on the total amount of the crystalline polyolefin and the grafting monomer; and
(B) 1 to 30 parts by weight of a hydrocarbon elastomer.

3 Claims, No Drawings

GRAFTED POLYOLEFIN COMPOSITION HAVING IMPROVED ADHESIVENESS

This invention relates to a graft-modified polyolefin composition having improved adhesion to polar materials.

Polyolefins are not adhesive to polar materials such as metals, concrete and polar resins, and it is common practice to modify them in order to impart adhesiveness. It is known, for example, that polyolefins can be rendered adhesive to polar materials by grafting an unsaturated carboxylic acid or its derivative thereto. This modifying method is generally preferred because high adhesiveness can be obtained, but suffers from the disadvantage that the modified polyolefins have low adhesion to certain classes of polar materials, and under severe service conditions, the adhesion strength of the bonded articles is not permanent but reduced with time.

It is an object of this invention therefore to provide a polyolefin composition modified with an unsaturated carboxylic acid grafted thereto which has improved initial adhesiveness and durable adhesiveness, especially the latter.

The present inventors worked extensively in order to achieve the above object, and unexpectedly found that the durable adhesiveness or both initial adhesiveness and durable adhesiveness of polyolefins modified with unsaturated carboxylic acids or their derivatives can be improved by blending specified amounts of hydrocarbon elastomers.

The present invention provides an improved composition having adhesion to polar solid materials which comprises (A) 99 to 70 parts by weight of a modified crystalline polyolefin having grafted thereto a monomer selected from the group consisting of unsaturated carboxylic acids and their anhydrides, esters, amides, imides and metal salts, said crystalline polyolefin having a degree of crystallinity measured by an X-ray analysis, of at least 25% and containing the grafting monomer in an amount of 0.0001 to 3% by weight based on the total amount of the crystalline polyolefin and the grafting monomer; and (B) 1 to 30 parts by weight of a hydrocarbon elastomer.

The "crystalline polyolefin," as referred to in the present application, denotes homopolymers of α-olefins such as ethylene, propylene, 1-butene, 1-pentene, 3-methyl-1-butene, 1-hexene or 4-methyl-1-pentene, copolymers of one of the above-mentioned monomers with not more than 10 mole %, preferably not more than 7 mole %, of another α-olefin, and mixtures of these, all of which have a degree of crystallinity, determined by an X-ray analysis, of at least 25%, preferably at least 50%. The advantages of the invention are especially outstanding with medium-and high-density polyethylenes and polypropylene.

The crystalline polyolefin used in this invention is modified by grafting an unsaturated carboxylic acid or its derivative thereto. Examples of the unsaturated carboxylic acid are acrylic acid, methacrylic acid, maleic acid, fumaric acid, itaconic acid, and citraconic acid. Examples of the derivatives of unsaturated carboxylic acids include their anhydrides, esters, amides, imides, and metal salts, such as maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, diethyl itaconate, acrylamide, methacrylamide, monomaleamide dimaleamide, N-monoethylmaleamide, N,N-diethylmaleamide, N-monobutylmaleamide, N,N-dibutylmaleamide, monofumaramide, difumaramide, N-monoethylfumaramide, N,N-diethylfumaramide, N-monobutylfumaramide, N,N-dibutylfumaramide, maleimide, N-butylmaleimide, N-phenylmaleimide, sodium acrylate, sodium methacrylate, potassium acrylate, and potassium methacrylate. Of these, maleic anhydride is most preferred.

The monomer used to modify the crystalline polyolefin is termed a grafting monomer in this application.

Grafting of the grafting monomer to the crystalline polyolefin can be performed by various known methods. For example, a polyolefin and a grafting monomer are heated at high temperatures in the presence or absence of a solvent with or without the addition of a radical initiator to perform grafting reaction. During the reaction (co-graft-polymerization), another vinyl monomer such as styrene can be caused to be present conjointly.

A mixture of the grafted crystalline polyolefin so obtained with an ungrafted crystalline polyolefin is also within the category of the graft-modified crystalline polyolefin in accordance with this invention.

The amount of the grafted monomer contained in the modified crystalline polyolefin (to be referred to as "graft ratio") is from 0.0001 to 3% by weight based on the total amount of the crystalline polyolefin and the grafting monomer.

The graft-modified crystalline polyolefin having a predetermined graft ratio can be obtained by reacting the crystalline polyolefin with the grafting monomer in an amount which achieves the predetermined graft ratio by the method described above. For actual production, it is convenient to react the polyolefin with the grafting monomer in an amount which gives a graft ratio larger than the predetermined one so as to prepare a graft-modified crystalline polyolefin having a high graft ratio, preferably a graft ratio of 0.01 to 6% by weight, and then mix the modified polyolefin with an ungrafted polyolefin to adjust the graft ratio to the predetermined one. It is easier for this method to adjust the graft ratio to the desired one. For example, by mixing 0.01 to 100 parts of a graft-modified crystalline polyolefin having a graft ratio of 0.01 to 6% by weight with up to 99.99 parts of an ungrafted crystalline polyolefin, the graft ratio of the mixture can be adjusted to 0.0001 to 3% by weight.

The term "hydrocarbon elastomer," as used in the present application, denotes, for example, natural rubber, polyisobutylene, ethylene/propylene rubber, ethylene/1-butene rubber, butyl rubber, butadiene rubber, styrene/butadiene rubber, ethylene/butadiene rubber, and isoprene rubber. Of these, synthetic hydrocarbon elastomers are preferred, the polyisobutylene and ethylene/propylene rubber being especially preferred.

The amount of the hydrocarbon elastomer to be blended with the graft-modified crystalline polyolefin is 1 to 30 parts by weight, preferably 3 to 20 parts by weight, per 100 parts by weight of the composition. When the amount of the hydrocarbon elastomer is less than 1 part by weight, scarcely any effect of improving adhesiveness is appreciable. On the other hand, addition of more than 30 parts by weight of the elastomer results in a reduction in adhesiveness, and a deterioration in mechanical properties, of the graft-modified crystalline polyolefin.

The polyolefin composition of this invention may further contain other conventional additives such as heat stabilizers, weather stabilizers, lubricants, antistatic agents, nucleating agents, fillers, pigments, dyes, fire retardants, antiblocking agents, and slip agents.

The polar materials, as referred to in this application, denote, for example, metals such as aluminum, iron, brass, and galvanized iron; inorganic materials such as glass, cement, and asbestos; and polar resins such as polyamides (e.g., nylon 6, nylon 10, nylon 11, nylon 12, nylon 66 and nylon 610), polyesters (e.g., polyethylene terephthalate, and polybutylene terephthalate), polycarbonate, a saponification product of an ethylene/vinyl acetate copolymer, epoxy resins, vinyl chloride resin, vinylidene chloride resin, and poly(methyl methacrylate).

The characteristic feature of the present invention is that by incorporating a small amount of the hydrocarbon elastomer in the crystalline polyolefin graft modified with an unsaturated carboxylic acid or its derivative having an effect of improving the adhesion of the polyolefin to polar materials, the resulting composition has markedly enhanced initial adhesiveness and durable adhesiveness over the graft-modified crystalline polyolefin alone. This unexpected advantage is demonstrated by Examples and Comparative Examples to be given hereinbelow.

Addition of the hydrocarbon elastomer to an unmodified crystalline polyolefin does not render it adhesive to polar materials. The effect of incorporating the hydrocarbon elastomer is observed only with graft-modified crystalline polyolefins, and addition of the hydrocarbon elastomer to random copolymers of α-olefins and unsaturated carboxylic acids or their derivatives or graft-modified amorphous polyolefins rather results in reduced adhesion to polar materials. Accordingly, the improvement of the adhesiveness, especially durable adhesiveness, of crystalline polyolefins obtained by the present invention is surprising.

Any desired method can be used to blend the hydrocarbon elastomer with the graft-modified crystalline polyolefin. Preferably, for example, both are mixed and kneaded by an extruder, a kneader, two rolls, a Banbury mixer, or the like at a suitable temperature above the melting point of the crystalline polyolefin and below 300° C.

The polyolefin composition of this invention can be bonded to a polar material by heating them to melt at least the polyolefin composition, and then joining them together, preferably under pressure. For example, when the polar material is not thermoplastic, there can be employed a method which comprises coating or laminating a molten polyolefin composition onto the polar material; a method comprising superimposing both together, and then melt-bonding them under heat; a method comprising adhering the polyolefin composition to the polar material by electrostaticity and then melting the polyolefin composition to laminate it on the polar material; and a method comprising heating the polar material to a temperature above the melting point of the polyolefin composition, and then adhering the polyolefin composition thereto and simultaneously melting it. Where the polar material is thermoplastic, there can be used a method which comprises melting both the polyolefin composition and the polar material and coextruding and laminating them, and a method which comprises coating or laminating the molten polyolefin composition onto the polar material. Although pre-treatments of one or both surfaces of the adherends, such as a flame treatment, a corona discharge treatment, and/or coating of a primer, are not required in bonding the polyolefin composition of this invention to polar materials, the adherends may be so treated, if desired.

When the polyolefin composition of this invention is bonded to polar materials, both initial adhesiveness and durable adhesiveness can be enhanced over the case of using crystalline polyolefins graft-modified with unsaturated carboxylic acids or their derivatives but not having the hydrocarbon elastomer blended therewith. Hence, the laminates or composites obtained can be used for long periods of time under more servere service conditions.

The composition of this invention finds many uses such as rustproof coatings or hot melt adhesives for metal tubes or plates, and laminate or composite films and sheets, and containers, tubes and bottles which are useful as packaging materials for foods, liquids, and medicines.

The following non-limitative Examples and Comparative Examples illustrate the present invention in greater detail. In these examples, the melt indices and densities of the polyolefins were measured in accordance with ASTM D-1238-65T (unit: g/10 min.), and ASTM D-1505-67, respectively.

EXAMPLE 1

A composition consisting of 2 parts by weight of high-density polyethylene (melt index 14, density 0.97 g/cm$^3$, crystallity 80%) containing 2% by weight of maleic anhydride grafted thereto, 93 parts of weight of mediumdensity polyethylene (melt index 1.0, density 0.94 g/cm$^3$, crystallinity 65%) and 5 parts by weight of polyisobutylene (VISTANEX MML-100, a trademark for a product of Exxon Chemical Co., density 0.92, and intrinsic viscosity [$\eta$] 2.58–3.15 dl/g measured in a diisobutylene solution) was bonded under pressure to each of (a) an aluminum foil, (b) a steel sheet, and (c) a tin plate, each of which had been degreased, at 200° C. for 5 minutes (the resin layer 1 mm; metal layer 0.1 mm) to form laminate sheets. A test piece with a width of 20 mm was cut away from each of the laminate sheets. The test pieces were partly delaminated, and then their peel strengths were measured by an Instron tester at a chuck speed of 100 mm/min. Furthermore, the test pieces were first allowed to stand for 72 hours in an air over at 100° C., or for 72 hours in boiling water, and then their peel strengths were measured by the same method.

EXAMPLE 2

Example 1 was repeated except that a composition consisting of 2 parts by weight of the polyethylene having grafted thereto maleic anhydride, 88 parts by weight of the medium-density polyethylene and 10 parts by weight of the polyisobutylene was used instead of the polyolefin composition used in Example 1.

EXAMPLE 3

Example 1 was repeated except that a composition consisting of 2 parts by weight of polypropylene (melt index 0.5, density 0.91 g/cm$^3$, crystallinity 60%) having grafted thereto 3% by weight of maleic anhydride, 93 parts by weight of polypropylene (melt index 0.5, density 0.91 g/cm$^3$, crystallinity 60%) and 5 parts by weight of polyisobutylene (VISTANEX MML-80, a trademark for a product of Exxon Chemical Co., density 0.92, intrinsic viscosity $[\eta]$2.04–2.57 dl/g measured in a di-isobutylene solution) was used, and bonded under pressure to metal at 220° C.

EXAMPLE 4

Example 3 was repeated except that a composition consisting of 2 parts by weight of the maleic anhydride-grafted polypropylene, 88 parts by weight of the polypropylene and 10 parts by weight of the polyisobutylene was used instead of the polyolefin composition used in Example 3.

Comparative Example 1

Example 1 was repeated except that a composition consisting of 2 parts by weight of the maleic anhydride-grafted polyethylene and 98 parts by weight of the medium-density polyethylene was used instead of the polyolefin composition used in Example 1.

Comparative Example 2

Example 1 was repeated except that 95 parts by weight of the medium-density polyethylene and 5 parts by weight of the polyisobutylene was used instead of the polyolefin composition used in Example 1.

Comparative Example 3

Example 3 was repeated except that a composition consisting of 2 parts by weight of the maleic anhydride-grafted polypropylene and 98 parts by weight of the polypropylene was used instead of the polyolefin composition used in Example 3.

Comparative Example 4

Example 3 was repeated except that a composition consisting of 95 parts by weight of the polypropylene and 5 parts by weight of the polyisobutylene was used instead of the polyolefin composition used in Example 3.

The results obtained in Examples 1 to 4 and Comparative Examples 1 to 4 are shown in Table 1. In Table 1, "Al broken" means that the aluminum base material itself broke before the bonded part was delaminated. The force exerted at break was more than about 16 kg/cm.

Table 1

| | Experiments | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition (parts by weight) | Polyethylene | | 93 | 88 | — | — | 98 | 95 | — | — |
| | Maleic anhydride-grafted polyethylene | | 2 | 2 | — | — | 2 | — | — | — |
| | Polypropylene | | — | — | 93 | 88 | — | — | 98 | 95 |
| | Maleic anhydride-grafted polypropylene | | — | — | 2 | 2 | — | — | 2 | — |
| | Polyisobutylene | | 5 | 10 | 5 | 10 | — | 5 | — | 5 |
| Peel strength (kg/cm) | Initial | Aluminum foil | Al broken | Al broken | Al broken | Al broken | 4.3 | 0 | 5.9 | 0 |
| | | Steel sheet | 10.0 | 9.8 | 7.8 | 8.0 | 7.8 | 0 | 2.7 | 0 |
| | | Tin plate | 7.2 | 7.0 | 7.2 | 7.0 | 5.7 | 0 | 3.3 | 0 |
| | After standing at 100° C. for 72 hours | Aluminum foil | Al broken | Al broken | Al broken | Al broken | 3.3 | — | 6.0 | — |
| | | Steel sheet | 11.0 | 10.2 | 7.5 | 7.8 | 6.4 | — | 2.5 | — |
| | | Tin plate | 8.3 | 8.5 | 6.8 | 7.0 | 5.0 | — | 1.9 | — |
| | After standing for 72 hours in boiling water | Aluminum foil | Al broken | Al broken | Al broken | Al broken | 3.2 | — | 4.3 | — |
| | | Steel sheet | 9.8 | 9.8 | 7.4 | 7.6 | 2.0 | — | 0.8 | — |
| | | Tin plate | 7.0 | 7.2 | 7.0 | 6.8 | 4.5 | — | 1.0 | — |

EXAMPLES 5 to 7 AND COMPARATIVE EXAMPLE 5

Polypropylene (melt index 0.5, density 0.91 g/cm$^3$, crystallinity 60%) having grafted thereto 3% by weight of maleic anhydride, a propylene/ethylene copolymer (melt index 0.5, ethylene content 4 mole%, crystallinity 58%), and polyisobutylene (VISTANEX MML-80) were mixed in the amounts indicated in Table 2, and pelletized at 230° C. by an extruder. The pellets obtained were melted by one extruder, and fed into a co-extrution die for composite bottle formation while maintaining the resin at a temperature of 230° C. On the other hand, nylon -6 (AMILAN CM1011, a trademark for a product of Toray Inc.) was melted by another extruder, and fed into the aforementioned co-extrution die while maintaining the resin at a temperature of 260° C. Through the die, 500 cc composite bottles having two layers were formed which had an outside polyolefin layer with a thickness of 1 mm and an inside nylon layer with a thickness of 0.1 mm. This bottle had excellent gas (oxygen) barrier properties, and was useful for packaging of food products and medicines. Test pieces, 20 mm wide, were cut away from the side surfaces of these bottles. The test pieces were partly delaminated between the polyolefin layer and the nylon layer, and the peel strengths of both layers were measured by an Instron tester at a chuck speed of 100 mm/min.

EXAMPLE 8

Example 5 was repeated using the same polyolefin composition as used in Example 6 except that an ethylene/propylene rubber (melt index 0.7 at 190° C., density 0.86 g/cm$^3$) was used instead of the polyisobutylene.

EXAMPLE 9

Example 5 was repeated using the same polyolefin composition as used in Example 6 except that an ethylene/1-butene rubber (melt index 3.5 at 190° C. density 0.89 g/cm$^3$) was used instead of the polyisobutylene.

Comparative Example 6

Example 5 was repeated except that a composition consisting of 90 parts by weight of the propylene/ethylene copolymer and 10 parts by weight of the polyisobutylene was used instead of the polyolefin composition used in Example 5.

The results obtained in Examples 5 to 9, and Comparative Examples 5 and 6 are shown in Table 2.

Table 2

| Experiments | Composition (parts by weight) | | | | | Peel strength (g/cm) |
|---|---|---|---|---|---|---|
| | Propylene/ ethylene copolymer | Maleic anhydride-grafted polypropylene | Polyisobutylene | Ethylene/ propylene rubber | Ethylene/ 1-butene rubber | |
| Ex. 5 | 93 | 2 | 5 | — | — | 1000 |
| Ex. 6 | 88 | 2 | 10 | — | — | 800 |
| Ex. 7 | 83 | 2 | 15 | — | — | 550 |
| Ex. 8 | 88 | 2 | — | 10 | — | above 1000 |
| Ex. 9 | 88 | 2 | — | — | 10 | above 1000 |
| Comp. Ex. 5 | 98 | 2 | — | — | — | 300 |
| Comp. Ex. 6 | 90 | — | 10 | — | — | 20 |

EXAMPLE 10

Two parts by weight of high-density polyethylene (melt index 14, density 0.97 g/cm$^3$, crystallinity 80%) having grafted thereto 2% by weight of maleic anhydride, 92 parts by weight of high-density polyethylene (melt index 1.0, density 0.96 g/cm$^3$, crystallinity 79%) and 5 parts by weight of polyisobutylene (VISTANEX MML-100) were mixed, and pelletized at 200° C. by an extruder. The pellets were melted separately by two extruders, and fed into a co-extrusion die for three layered composite sheet formation while maintaining the resin at a temperature of 200° C. On the other hand, an ethylene/vinyl alcohol copolymer (saponification product of ethylene/vinyl acetate copolymer, ethylene content 31 mole%, melt index 2.5 at 190° C. the degree of saponification 99%) was melted by another extruder, and fed to the co-extrusion die while maintaining the resin at a temperature of 200° C. Through the die, a co-extruded sheet or a three-layer laminate sheet was formed which consisted of outside polyolefin layers each with a thickness of 0.4 mm and an interlayer of the ethylene/vinyl alcohol copolymer with a thickness of 0.1 mm. This sheet exhibited excellent oxygan barrier properties, and was useful for packaging of food products and medicines. Test pieces, 20 mm wide, were cut away from the laminate sheet. The test pieces were partly delaminated between one of the polyolefin layers and the ethylene/vinyl alcohol copolymer layer. Then, the peel strengths of both layers were measured by an Instron tester at a chuck speed of 100 mm/min., and found to be 650 g.

Comparative Example 7

Example 10 was repeated except that a composition consisting of 3 parts by weight of the high-density polyethylene having maleic anhydride grafted thereto and 97 parts by weight of the medium-density polyethylene was used instead of the polyolefin composition used in Example 10. The peel strength of the bonded article was found to be 380 g/cm.

Comparative Example 8

Example 10 was repeated except that a composition consisting of 90 parts by weight of the medium-density polyethylene and 10 parts by weight of the polyisobutylene was used instead of the polyolefin composition used in Example 10. The polyolefin layer could not be bonded to the ethylene/vinyl alcohol copolymer.

What we claim is:

1. A composition having improved adhesion to polar solid materials which consists essentially of
   (A) 97 to 80 parts by weight based on the total weight of the resin composition of a modified crystalline polyolefin having grafted thereto a monomer selected from the group consisting of unsaturated aliphatic carboxylic acids selected from the group consisting of acrylic acid, methacrylic acid, maleic acid, fumaric acid, itaconic acid and citraconic acid, or its anhydride, ester, amide, imide or metal salt, said crystalline polyolefin having a degree of crystallinity measured by an X-ray analysis, of at least 25%, and containing the grafting monomer in an amount of 0.0001 to 3% by weight based on the total amount of the crystalline polyolefin and the grafting monomer; and
   (B) 3 to 20 parts by weight of a hydrocarbon elastomer selected from the group consisting of natural rubber, polyisobutylene, ethylene/propylene rubber, ethylene/1-butene rubber, butyl rubber, styrene butadiene rubber, ethylene/butadiene rubber, or isoprene rubber.

2. The composition of claim 1 wherein the graft-modified crystalline polyolefin is a mixture of a grafted crystalline polyolefin having grafted thereto a grafting monomer with an ungrafted crystalline polyolefin.

3. The composition of claim 1 wherein the crystalline polyolefin is a homopolymer or copolymer of an α-olefin selected from the group consisting of ethylene, propylene, 1-butene, 1-pentene, 3-methyl-1-butene, 1-hexene and 4-methyl-1-pentene.

* * * * *

REEXAMINATION CERTIFICATE (1640th)

United States Patent [19]

Matsumoto et al.

[11] B1 4,198,327

[45] Certificate Issued  Feb. 18, 1992

[54] GRAFTED POLYOLEFIN COMPOSITION HAVING IMPROVED ADHESIVENESS

[76] Inventors: Hisashi Matsumoto, 2-35, 1-chome, Muronoki-machi, Iwakuni-shi, Yamaguchi-ken; Hiroji Niimi, 888, Oaza Waki, Waki-machi, Kuga-gun, Yamaguchi-ken, both of Japan

Reexamination Request:
No. 90/002,419, Aug. 27, 1991

Reexamination Certificate for:
Patent No.: 4,198,327
Issued: Apr. 15, 1980
Appl. No.: 753,412
Filed: Dec. 22, 1976

[30] Foreign Application Priority Data

Dec. 27, 1975 [JP] Japan ................. 50-155864

[51] Int. Cl.$^5$ ............ C08L 51/04; C08L 51/06

[52] U.S. Cl. ................. 525/73; 428/492; 428/500; 428/521; 428/522; 428/523; 525/74; 525/77; 525/78; 525/80; 525/81; 525/84; 525/86

[58] Field of Search .......... 525/73, 74, 77, 78, 525/80, 81, 84, 86

[56] References Cited

U.S. PATENT DOCUMENTS 4,058,647 11/1977 Inoue et al. ................. 428/474

Primary Examiner—Harold D. Anderson

[57] ABSTRACT

A composition having improved adhesion to polar solid materials which comprises
(A) 99 to 70 parts by weight of a modified crystalline polyolefin having grafted thereto a monomer selected from the group consisting of unsaturated carboxylic acids and their anhydrides, esters, amides imides and metal salts, said crystalline polyolefin having a degree of crystallinity measured by an X-ray analysis, of at least 25% and containing the grafting monomer in an amount of 0.0001 to 3% by weight based on the total amount of the crystalline polyolefin and the grafting monomer; and
(B) 1 to 30 parts by weight of a hydrocarbon elastomer.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the tent, but has been deleted and is no longer a part of the tent; matter printed in italics indicates additions made the patent.

AS A RESULT OF REEXAMINATION, IT HAS BEEN DETERMINED THAT:

Claim 1 is determined to be patentable as amended.

Claims 2-3, dependent on an amended claim, are termined to be patentable.

1. A composition having improved adhesion to polar solid materials which consists essentially of
   (A) 97 to 80 parts by weight based on the total weight of the resin composition of a modified crystalline polyolefin having grafted thereto a monomer selected from the group consisting of unsaturated aliphatic carboxylic acids selected from the group consisting of acrylic acid, methacrylic acid, maleic acid, fumaric acid, itaconic acid and citraconic acid, or its anhydride, ester, amide, imide or metal salt, said crystalline polyolefin having a degree of crystallinity measured by an X-ray analysis, of at least 25%, and containing the grafting monomer in an amount of 0.0001 to 3% by weight based on the total amount of the crystalline polyolefin and the grafting monomer; and
   (B) 3 to 20 parts by weight of a hydrocarbon elastomer selected from the group consisting of [natural rubber,] polyisobutylene, ethylene/propylene rubber, ethylene/1-butene rubber, butyl rubber, styrene butadiene rubber, ethylene/butadiene rubber, or isoprene rubber.

* * * * *